United States Patent Office 3,351,638
Patented Nov. 7, 1967

3,351,638
NOVEL SUBSTITUTED 21-NOR-$\Delta^{20(22), 23}$-STEROIDAL DIENES
John Paul Dusza, Nanuet, N.Y., Joseph Peter Joseph, Cliffside Park, N.J., and Seymour Bernstein, New City, N.Y., assignors to American Cyanamid Company, Stamford, Conn., a corporation of Maine
No Drawing. Filed July 29, 1966, Ser. No. 568,727
10 Claims. (Cl. 260—397.1)

This invention relates to new steroid compounds. More particularly, it relates to novel substituted 21-nor-$\Delta^{20(22),23}$-steroidal dienes and to methods for their preparation.

The novel compounds of this invention may be represented by the following formula:

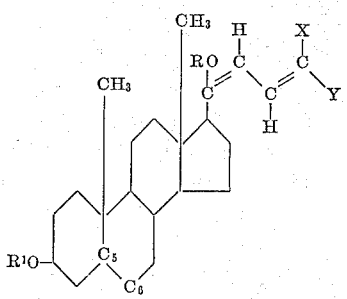

wherein X is selected from the group consisting of hydrogen, lower alkyl, carbo loweralkoxy and cyano; Y is selected from the group consisting of carbo loweralkoxy, cyano and nitro; R is lower alkyl; $R^1$ is selected from the group consisting of hydrogen and lower alkanoyl and $C_5$—$C_6$ is a trivalent radical selected from the group consisting of

and

The novel compounds of the present invention are in general crystalline solids substantially insoluble in water and somewhat soluble in the usually available organic solvents.

The compounds of this invention are prepared from the steroids described in our U.S. Patent 3,201,425. These starting materials have the structure hereinbefore described with the exception that the 21-position contains a formyl group. To produce the present compounds, the 21-formyl steroids are reacted with various reagents such as, for example, triethylphosphonoacetate, ethylbromoacetate - zinc, carbethoxyethylidenetriphenylphosphone, dimethyl malonate, diethyl cyanomethylphosphonate, malononitrile, ethyl cyanoacetate, nitromethane, nitroethane and the like.

The process of the present invention is preferably carried out in a solvent at a temperature of from about 25° C. to 150° C. for a period of from 10 minutes to 10 hours. The solvents may be for example, tetrahydrofuran, benzene, absolute ethanol, nitromethane, nitroethane and the like. The reagent to produce the desired compound when reacted with the 21-formylsteroid may, when liquid, also serve as the solvent for the reaction.

Among the 21-formylsteroids useful as starting materials in the process of the present invention may be, for example, 3β-acetoxy-20-ethoxy-21-formylpregna-5,20-diene,
21-formyl-3β,20-dimethoxypregna-5,20-diene,
3β-acetoxy-21-formyl-20-methoxy-16α-methylpregna-5,20-diene,
3β-acetoxy-20-ethoxy-21-formyl-16α-methylpregna-5,20-diene,
3β-acetoxy-21-formyl-20-methoxyallopregn-20-ene,
3β-acetoxy-21-formyl-20-methoxypregn-20-ene,
3β-acetoxy-21-formyl-20-methoxy-6-methylpregna-5,20-diene,
3α,6α-diacetoxy-21-formyl-20-methoxypregn-20-ene,
3α,12α-diacetoxy-21-formyl-20-methoxypregn-20-ene,
21-formyl-3,3,20-trimethoxypregna-11,20-diene,
21-formyl-20-methoxypregna-5,20-dien-3β-ol,
and 20-ethoxy-21-formypregna-5,20-dien-3β-ol.

The novel compounds of the present invention possess antigonadotropic and anabolic activity when administered to warm-blooded animals. As such, therefore, the compounds have utility as therapeutic agents, particularly in protein replacement therapy.

The invention will be described in greater detail in conjunction with the following specific examples describing the preparation of representative 21-nor-$\Delta^{20(22),23}$-steroidal dienes.

EXAMPLE 1

*Preparation of ethyl 3β-acetoxy-20-methoxy-21-norchola-5,20-[cis],23[trans]-triene-24-carboxylate*

This compound may be prepared by either of two following procedures.

*Procedure A.*—Triethylphosphonoacetate (1.13 g.) is dissolved in dry tetrahydrofuran (50 ml.) and stirred for 1 hour, after the addition of 0.22 g. of sodium hydride (54.7% oil suspension). To this mixture is added a solution of 1.0 of 3β-acetoxy-21-formyl-20-methoxypregna - 5,20-(22) - diene in 10 ml. of dry tetrahydrofuran. This reaction mixture is stirred for 1 hour and then refluxed for ½ hour. The solvent is removed at reduced pressure, water is added and the mixture is extracted with ether. The ether extract is washed well with a saturated saline solution, dried and evaporated to yield a solid. The solid is recrystallized twice from methanol to yield 0.52 g. of ethyl 3β-acetoxy-20-methoxy-21-norchola-5,20[cis],23[trans]-triene-24-carboxylate, melting point 161–162° C., $\lambda_{max.}^{MeOH}$ 302 m$\mu$ ($\epsilon$ 27,000)

*Procedure B.*—Zinc dust (1.64 g.) is suspended in benzene (100 ml.) and the reaction mixture distilled until 75 ml. of benzene is collected. To this dried solution, ethyl bromoacetate (4.17 g.) in dry benzene (25 ml.) is added and the mixture is refluxed for 1 hour. After the zinc reagent has been prepared 2.0 g. of 3β-acetoxy-21-formyl-20-methoxypregna-5,20-diene in 25 ml. of dry benzene is added and refluxing is continued for 1 hour. Water is added to decompose excess reagent and then 20% aqueous sulfuric acid is added. The reaction mixture is extracted with ether which in turn is washed with saturated sodium bicarbonate and then with a saturated saline solution. Evaporation of the ether gives a solid which is subsequently chromatographed on activated magnesium silicate. The material eluted with the latter 2% acetone-petroleum ether (1×100 ml.) and the initial 3% acetone-petroleum ether (4×100 ml.) fractions is recrystallized from methanol to yield 0.46 g. of the subject compound, melting point 155–156° C.

EXAMPLE 2

*Preparation of ethyl 3β - acetoxy - 20-ethoxy-24-methyl-21-norchola-5,20[cis],23-[trans]-triene-24-carboxylate*

A solution of 3β-acetoxy-20-ethoxy-21-formylpregna-5,20-diene (2.0 g.) in benzene (100 ml.) is distilled until 50 ml. of benzene is collected. To this dried reaction mixture is added carbethoxyethylidenetriphenylphosphone (5.14 g.) and this is refluxed for 6 hours under nitrogen. Thin layer chromatography of the crude reaction mixture indicates approximately 50% conversion of the aldehyde into the dienic ester. Chromatography on activated magnesium silicate with elution with 2 and 3% acetone-hexane mixtures and recrystallization from methanol-water and methanol gives 0.93 g. of ethyl 3β-acetoxy-20-ethoxy-24-methyl-21-norchola-5,20[cis], 23-[trans] - triene-24-carboxylate, melting point 128–132° C., $\lambda_{max.}^{MeOH}$ 303 m$\mu$ ($\epsilon$ 25,700)

EXAMPLE 3

*Preparation of dimethyl 3β-acetoxy-20-methoxy-21-norchola-5,20[cis],23-triene-24,24-dicarboxylate*

A reaction mixture consisting of 3β-acetoxy-21-formyl-20-methoxypregna-5,20-diene (2.0 g.) acetic anhydride (20 ml.), dimethyl malonate (0.8 ml.) and zinc chloride (50 mg.) is refluxed for 1 hour. After cooling, the solution is poured into water and the mixture is filtered. A methylene chloride solution of the crude solid is passed through a hydrous magnesium silicate pad and eluted with additional methylene chloride (400 ml.). Evaporation of the eluate yields a crystalline solid which is further chromatographed on activated magnesium silicate. The material eluted with the latter 4% acetone-petroleum ether (2×100 ml.) and early 6% acetone-petroleum ether (4×100 ml.) fractions is combined and recrystallized from acetone-hexane to yield 0.98 g. of the diester, dimethyl 3β - acetoxy-20-methoxy-21-norchola-5,20-[cis], 23-triene-24,24-dicarboxylate, melting point 167–170° C., $\lambda_{max.}^{MeOH}$ 319 m$\mu$ ($\epsilon$ 26,800)

This compound is useful for its antigonadotropic activity.

EXAMPLE 4

*Preparation of dimethyl 3β-acetoxy-20-ethoxy-21-norchola-5,20[cis],23-[trans]-triene*

3β-acetoxy-20-ethoxy - 21 - formylpregna - 5,20-diene (0.83 g.) and dimethyl malonate (0.29 g.) are dissolved in 50 ml. of absolute ethanol containing 0.17 ml. of piperidine and two drops of glacial acetic acid. After refluxing on a steam bath for 0.5 hour the reaction mixture is evaporated to dryness yielding a yellow gum (0.40 g.) which crystallizes on the addition of methanol. Two recrystallizations from methanol gives the white crystalline product, dimethyl 3β - acetoxy - 20-ethoxy-21-norchola-5,20[cis],23-triene-24,24-dicarboxylate, melting point 120–122° C., $\lambda_{max.}^{MeOH}$ 320 m$\mu$ ($\epsilon$ 25,000)

EXAMPLE 5

*Preparation of 3β - acetoxy-24-cyano-20-methoxy-21-norchola-5,20[cis],23-[trans]-triene*

An exothermic reaction is effected when sodium hydride (1.1 g.), 54.7% oil suspension, is added to a well stirred solution of diethyl cyanomethylphosphate (4.42 g.) in dry tetrahydrofuran (25 ml.). After stirring for 1 hour a solution of 3β-acetoxy-21-formyl-20-methoxypregna-5,20-diene (5.0 g.) in dry tetrahydrofuran (50 ml.) is introduced and the reaction mixture stirred for an additional 1 hour and then refluxed for 30 min. after which time the solvents are removed under reduced pressure. Water and ether are added; the ether soluble fraction is then separated and washed with a saturated saline solution. Evaporation of the ether gives a solid which is crystallized from methanol (activated carbon used to remove impurities) to yield 2.2 g. of 3β-acetoxy-24-cyano-20-methoxy-21-norchola - 5,20[cis],23-[trans] - triene, melting point 209–212° C. Recrystallization from methanol gives 1.2 g. of an analytical sample, melting point 219–220° C., $\lambda_{max.}^{MeOH+Methyl\ Cellosolve}$ 293 m$\mu$ ($\epsilon$ 30,900)

EXAMPLE 6

*Preparation of 3β - acetoxy-24,24-dicyano-20-ethoxy-21-norchola-5,20[cis],23-triene*

To a solution of 3β-acetoxy-20-ethoxy-21-formylpregna-5,20-diene (2.0 g.) in 100 ml. of absolute ethanol is added malononitrile (0.35 g.), piperidine (0.5 ml.), and three drops of glacial acetic acid. The reaction mixture is refluxed for 5 minutes and cooled. The deep-red colored solution is refrigerated overnight in methylene chloride and passed through a pad of hydrous magnesium silicate. A red colored contaminant is absorbed and the yellow effluent is evaporated to yield 2.0 g. of the dinitrile. Crystallization from methanol gives 0.87 g. of the desired compound as a yellow solid, melting point 180–181° C.

EXAMPLE 7

*Preparation of ethyl 3β - acetoxy-24-cyano-20-ethoxy-21-norchola-5,20[cis],23-[trans]-triene-24-carboxylate*

A reaction mixture consisting of 3β-acetoxy-20-ethoxy-21-formylpregna-5,20-diene (1.0 g.), ethyl cyanoacetate (0.3 ml.), piperidine (0.2 ml.), and two drops of glacial acetic acid in 50 ml. of absolute ethanol is refluxed for 5 minutes and cooled. The precipitated solid (0.94 g.) melting point 171–172° C. is crystallized from methanol to yield 0.76 g. of ethyl 3β-acetoxy-24-cyano-20-ethoxy-21-norchola - 5,20[cis],23-[trans]-triene-24 - carboxylate with no change in melting point, $\lambda_{max.}^{MeOH}$ 338 m$\mu$ ($\epsilon$ 29,100)

EXAMPLE 8

*Preparation of 3β - acetoxy-20-methoxy-24-nitro-21-norchola-5,20[cis],23-[trans]-triene*

3β - acetoxy-21-formyl-20-methoxypregna - 5,20-diene (1.0 g.) ammonium acetate (0.5 g.) in nitromethane (10 ml.) is heated on a steam bath for 0.5 hour and then poured into water. The precipitated solid is filtered off, dissolved in methylene chloride and passed through hydrous magnesium silicate. The orange-colored eluate is collected, evaporated and crystallized to yield 0.225 g. of the nitro diene, melting point 224–226° C., $\lambda_{max.}^{MeOH}$ 225 and 362 m$\mu$ ($\epsilon$ 7,500 and 18,000, respectively)

This compound possesses anabolic activity.

EXAMPLE 9

*Preparation of 3β - acetoxy-20-methoxy-24-methyl-24-nitro-21-norchola-5,20[cis],23-[trans]-triene*

Using the procedure of Example 8 and replacing nitromethane with 10 ml. of nitroethane, 0.32 g. of the yellow nitro triene product is prepared, melting point 220–221° C., $\lambda_{max.}^{MeOH}$ 225 and 370 m$\mu$ ($\epsilon$ 10,600 and 14,400, respectively)

EXAMPLE 10

*Preparation of 3β - acetoxy-20-methoxy-24-nitro-21-nor-5α-chola-20[cis],23-[trans]-diene*

A suspnsion of 3β - actoxy-21-formyl - 20 - methoxypregn-20-ene (4.0 g.) and ammonium acetate (2.0 g.) in nitromethane (50 ml.) is heated on a steam bath for 0.5 hour. After cooling the reaction mixture is poured into water and separated into a liquid and semisolid phase. The semisolid is dissolved in methylene chloride and passed through a hydrous magnesium silicate pad. 400 ml. of additional methylene chloride is passed through the pad. Evaporation of the eluate gives a red-orange colored solid which is recrystallized three times from methanol to yield 0.37 g. of the nitroolefin, melting point 183–184° C., $\lambda_{max.}^{MeOH}$ 252 and 362 mµ ($\epsilon$ 7,150 and 10,000, respectively)

What is claimed is:

1. A steroid of the formula:

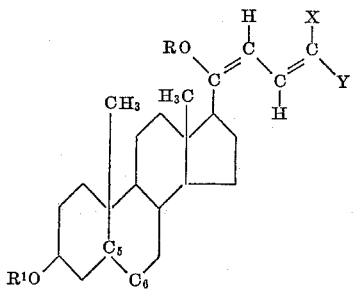

wherein X is selected from the group consisting of hydrogen, lower alkyl, carboloweralkoxy and cyano; Y is selected from the group consisting of carboloweralkoxy, cyano and nitro; R is lower alkyl; $R^1$ is selected from the group consisting of hydrogen and lower alkanoyl and $C_5$—$C_6$ is a trivalent radical selected from the group consisting of

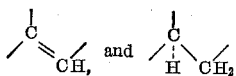

2. A compound according to claim 1, wherein the steroid is ethyl 3β-acetoxy-20-methoxy-21-norchola-5,20-[cis],23-[trans]-triene-24-carboxylate.

3. A compound according to claim 1, wherein the steroid is ethyl 3β-acetoxy-20-ethoxy-24-methyl-21-norchola-5,20[cis],23-[trans]-triene-24-carboxylate.

4. A compound according to claim 1, wherein the steroid is dimethyl 3β-acetoxy-20-methoxy-21-norchola-5,20[cis],23-triene-24-24-dicarboxylate.

5. A compound according to claim 1, wherein the steroid is dimethyl 3β-acetoxy-20-ethoxy-21-norchola-5,20-[cis],23-triene-24,24-dicarboxylate.

6. A compound according to claim 1, wherein the steroid is 3β-acetoxy-24-cyano-20-methoxy-21-norchola-5,20[cis],23-[trans]-triene.

7. A compound according to claim 1, wherein the steroid is 3β-acetoxy-24,24-dicyano-20-ethoxy-21-norchola-5,20[cis]-23-triene.

8. A compound according to claim 1, wherein the steroid is ethyl 3β-acetoxy-24-cyano-20-ethoxy-21-norchola-5,20[cis]23-[trans]-triene-24-carboxylate.

9. A compound according to claim 1, wherein the steroid is 3β-acetoxy-20-methoxy-24-methyl-24-nitro-21-norchola-5,20[cis],23-[trans]-triene.

10. A compound according to claim 1, wherein the steroid is 3β-acetoxy-20-methoxy-24-nitro-21-nor-5α-chola-20[cis],23-[trans]-diene.

References Cited

UNITED STATES PATENTS 3,201,425  8/1965  Dusza et al. _____ 260—397.1

ELBERT L. ROBERTS, *Primary Examiner.*